United States Patent
Yasui et al.

(10) Patent No.: US 10,569,626 B2
(45) Date of Patent: Feb. 25, 2020

(54) DEFLECTOR DEVICE FOR VEHICLE SUNROOF

(71) Applicants: YACHIYO INDUSTRY CO., LTD., Saitama (JP); HONDA MOTOR CO., LTD., Tokyo (JP)

(72) Inventors: Ryota Yasui, Tochigi (JP); Toshiaki Kuroi, Tochigi (JP); Atsuko Kubota, Tokyo (JP); Makoto Kurita, Tochigi (JP); Shoichi Yokoyama, Tochigi (JP)

(73) Assignees: YACHIYO INDUSTRY CO., LTD., Saitama (JP); HONDA MOTOR CO., LTD., Tokyo (JP)

( * ) Notice: Subject to any disclaimer, the term of this patent is extended or adjusted under 35 U.S.C. 154(b) by 58 days.

(21) Appl. No.: 15/749,411

(22) PCT Filed: Aug. 24, 2017

(86) PCT No.: PCT/JP2017/030234
§ 371 (c)(1),
(2) Date: Jan. 31, 2018

(87) PCT Pub. No.: WO2018/055973
PCT Pub. Date: Mar. 29, 2018

(65) Prior Publication Data
US 2019/0016200 A1    Jan. 17, 2019

(30) Foreign Application Priority Data

Sep. 21, 2016   (JP) .................................. 2016-184753

(51) Int. Cl.
*B60J 7/22*    (2006.01)
*B60J 7/043*   (2006.01)

(52) U.S. Cl.
CPC ................. *B60J 7/22* (2013.01); *B60J 7/043* (2013.01)

(58) Field of Classification Search
CPC ..................................... B60J 7/22; B60J 7/223
(Continued)

(56) References Cited

U.S. PATENT DOCUMENTS 6,666,503 B1    12/2003  Sorensen
8,157,319 B2 *   4/2012  Hori ........................... B60J 7/22
                                                            296/217

(Continued)

FOREIGN PATENT DOCUMENTS

EP          1281556    *  7/2002  ................ B60J 7/22

OTHER PUBLICATIONS

International Search Report and Written Opinion of the International Search Report for PCT/JP2017/030234 dated Oct. 3, 2017.

*Primary Examiner* — Dennis H Pedder
(74) *Attorney, Agent, or Firm* — Kenealy Vaidya LLP

(57) ABSTRACT

A deflector device for a vehicle sunroof is provided. The deflector device includes: a cloth deflector net which is extended to be blown by a drive airflow during operation period and folded to be housed during non-operation period; a lower holder which holds a lower end side of the deflector net; an upper holder which holds an upper end side of the deflector net and is movable in a vertical direction; an urging member which urges the upper holder upward; and a defining portion which defines an upper limit position of the upper holder against an urging force caused by the urging member so that loosing occurs on at least a part of the deflector net.

3 Claims, 5 Drawing Sheets

(58) Field of Classification Search
USPC .......................................................... 296/217
See application file for complete search history.

(56) References Cited

U.S. PATENT DOCUMENTS

| 8,292,360 B2* | 10/2012 | Uehara ................... B60J 7/226 |
| | | 296/217 |
| 2007/0096509 A1 | 5/2007 | Johannes Manders |
| 2017/0182870 A1 | 6/2017 | Takahashi et al. |

* cited by examiner

FIRST EMBODIMENT

SECOND EMBODIMENT

FIG. 6A
ONLY REACTION FORCE CAUSED BY URGING MEMBER

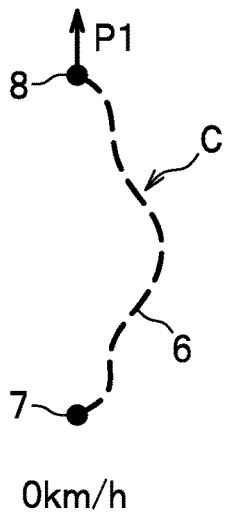

0km/h

FIG. 6B
REACTION FORCE CAUSED BY URGING MEMBER >WIND FORCE

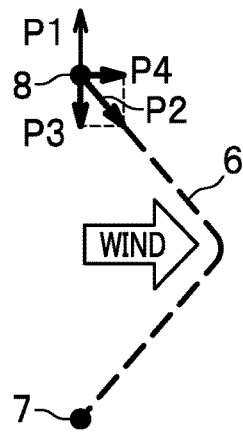

50km/h

FIG. 6C
REACTION FORCE CAUSED BY URGING MEMBER =WIND FORCE

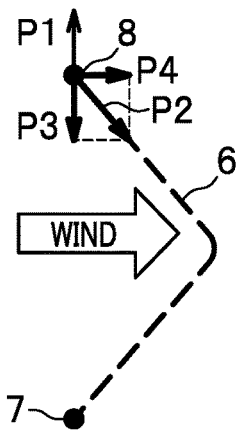

100km/h

FIG. 6D
REACTION FORCE CAUSED BY URGING MEMBER <WIND FORCE

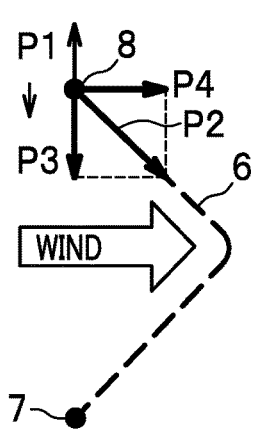

120km/h

FIG. 7A
PRIOR ART
ONLY REACTION FORCE CAUSED BY URGING MEMBER

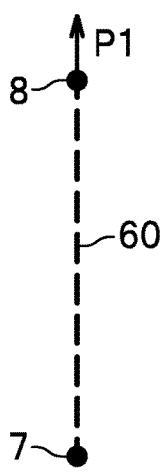

0km/h

FIG. 7B
PRIOR ART
REACTION FORCE CAUSED BY URGING MEMBER =WIND FORCE

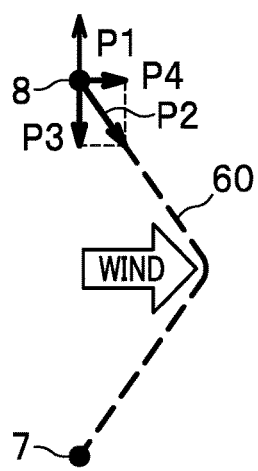

50km/h

FIG. 7C
PRIOR ART
REACTION FORCE CAUSED BY URGING MEMBER <WIND FORCE

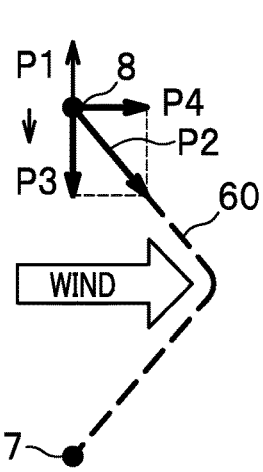

100km/h

FIG. 7D
PRIOR ART
REACTION FORCE CAUSED BY URGING MEMBER <WIND FORCE

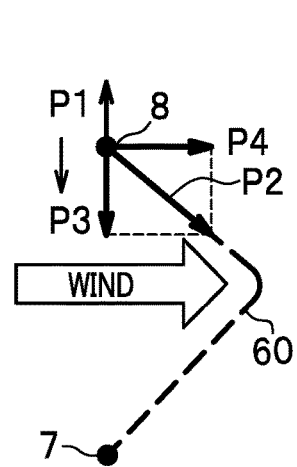

120km/h

DEFLECTOR DEVICE FOR VEHICLE SUNROOF

FIELD OF INVENTION

The present invention relates to a deflector device for a vehicle sunroof.

BACKGROUND ART

A deflector device for a vehicle sunroof is well known. The deflector device has a thin cloth deflector net which is extended to be blown by drive airflow during operation period and folded to be housed during non-operation period. Patent Literature 1 discloses that a lower end side of a deflector net is held by a lower end holding portion, an upper end side is held by an upper end holding portion which is movable in a vertical direction, and the upper end holding portion is urged upward by an urging member during operation period so as to fully extend the deflector net by stretching.

PRIOR ART DOCUMENT(S)

Patent Literature(s)

Patent Literature 1: JP 2015-229453 A

SUMMARY OF INVENTION

Problems to be Solved by the Invention

Conventionally, when the deflector net extended by stretching is blown by a strong drive airflow at high speed traveling, the deflector net is pushed backward by wind, and the upper end holding portion is lowered. Further, when a vehicle follows a preceding vehicle at high speed, turbulence due to the preceding vehicle causes change in the drive airflow, and the upper end holding portion flaps in the vertical direction.

The present invention is made in order to solve the above problems. An object of the present invention is to suppress a displacement of the upper end holding portion of the deflector device for vehicle sunroof at high speed traveling.

Means for Solving the Problems

In order to solve the above problems, the present invention provides a deflector device for a vehicle sunroof, the deflector device includes: a cloth deflector net which is extended to be blown by a drive airflow during operation period and folded to be housed during non-operation period; a lower end holding portion which holds a lower end side of the deflector net; an upper end holding portion which holds an upper end side of the deflector net and is movable in a vertical direction; an urging member which urges the upper end holding portion upward; and a defining portion which defines an upper limit position of the upper end holding portion against an urging force caused by the urging member so as to loosen at least a part of the deflector net.

According to the present invention, since the deflector net is loosen in an initial state, a vehicle traveling speed can be increased when the upper end holding portion is lowered by the drive airflow. In this way, a displacement of the upper end holding portion at high speed traveling can be suppressed. When a vehicle follows a preceding vehicle at high speed, a flapping of the upper end holding portion caused by the turbulence can be suppressed, and generation of a flapping sound can be suppressed.

Also, in the present invention, the defining portion includes a stretching portion stretched by an urging force caused by the urging member between the lower end holding portion and the upper end holding portion.

According to the present invention, there is no need to provide an installation space for the stretching portion separately, and the stretching portion can be stored in a storage space of the deflector net.

Also, in the present invention, a vertical length of the deflector net of the stretching portion is made to be partially short along a vehicle width direction.

According to the present invention, there is no need to provide a member dedicated for the stretching portion separately, and an economical deflector device can be achieved.

Also, in the present invention, the stretching portion is made of a flexible stretching member separated from the deflector net.

According to the present invention, the stretching member can be easily folded to be housed along with the deflector net since the stretching member is flexible.

Also, in the present invention, the stretching portions are provided at both sides of the deflector net in the vehicle width direction.

According to the present invention, the deflector net is largely affected by the drive airflow, loosing can be occurred at a center portion in the vehicle width direction of the deflector net, and displacement of the upper end holding portion can be effectively suppressed.

Effect of the Invention

According to the present invention, displacement of the upper end holding portion can be suppressed at high speed traveling.

BRIEF DESCRIPTION OF THE DRAWINGS

FIGS. 6A-6D are a sectional views showing action of a deflector net of the present invention;

FIGS. 7A-7D are sectional views showing action of a deflector net of the prior art;

DESCRIPTION OF PREFERRED EMBODIMENTS

Figure 1:
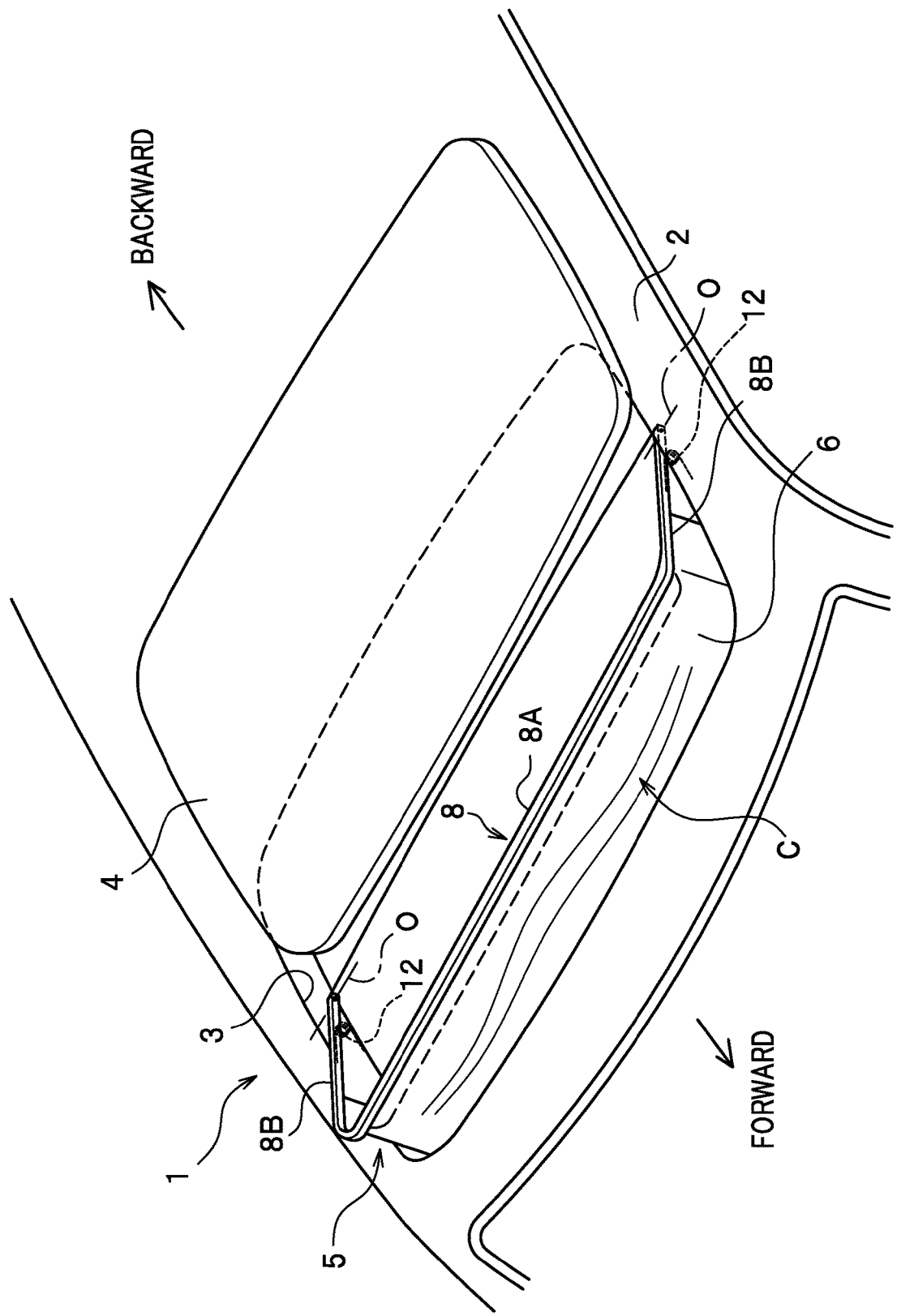
FIG. 1 is a perspective view of a deflector device.

As shown in FIG. 1, a vehicle sunroof 1 is provided with a roof panel 4 which opens and closes an approximately rectangular opening portion 3 formed in a fixed roof 2 of a vehicle body, and a deflector device 5 which projects upward from the fixed roof 2 along a leading edge of the opening portion 3 when the roof panel 4 is slid backward so as to open the opening portion 3.

Figure 2:
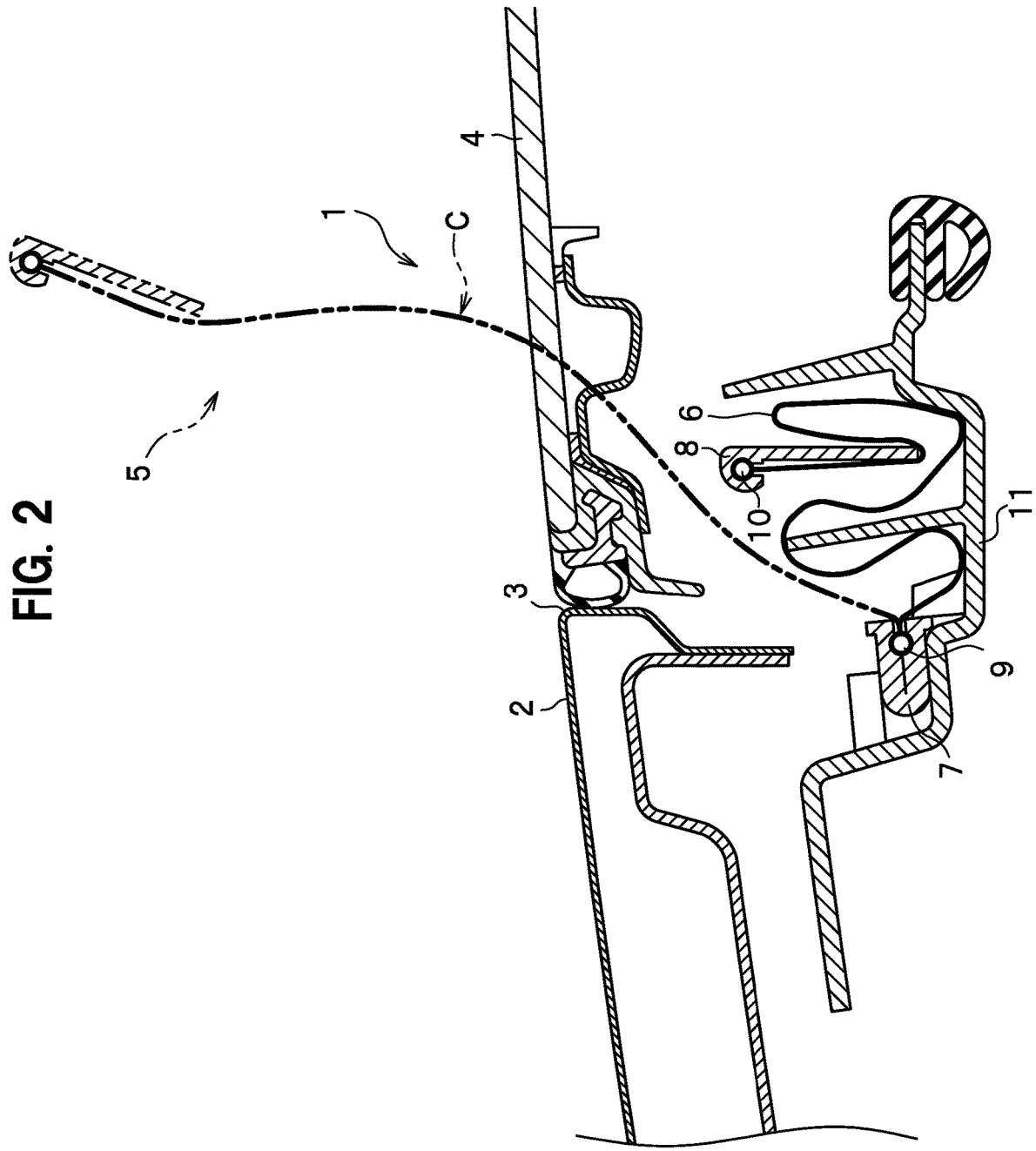
FIG. 2 is a side cross-sectional view of the deflector device.

As shown in FIG. 2, a deflector device 5 is provided with a wide thin cloth deflector net 6 which is extended to be blown by a drive airflow during operation period and folded to be housed during non-operation period, a lower holder (lower end holding portion) 7 which holds a lower end side of the deflector net 6, an upper holder (upper end holding portion) 8 which holds and moves vertically an upper end side of the deflector net 6, an urging member 12 which urges the upper holder 8 upward, and a defining portion 21.

The deflector net 6 is made of a flexible fabric net with fine meshes. A lower line and an upper line of the deflector net 6 are formed to be envelopes in side cross-sectional view by sewing, etc. Core bars 9, 10 are inserted into the envelopes respectively, and fitted into recesses of the lower holder 7 and the upper holder 8 to be fixed respectively. The lower holder 7 and the upper holder 8 are molded by, for example, a resin member.

As shown in FIG. 1, the upper holder 8 is provided with a center holder portion 8A which extends in the vehicle width direction along the leading edge of the opening portion 3, and deflector arms 8B, 8B which extend from both ends of the center holder portion 8A backward and are bent at right angle. Both ends of the deflector net 6 are fixed to the upper holder 8 and the lower holder 7 so that the deflector net 6 extends to the middles of the deflector arms 8B, 8B. Rear ends of the deflector arms 8B, 8B are rotatably supported around a rotation axis O along the vehicle width direction. The deflector arms 8B, 8B are provided with an urging members 12 which rotatably urge the upper holder 8 upward around the rotation axis O. The urging member 12 is, for example, a swing coil spring.

As shown in FIG. 2, the lower holder 7 is formed along the leading edge of the opening portion 3. Both ends of the lower holder 7 extend backward like the deflector arms 8B, 8B. The lower holder 7 is fixed to a front frame 11. Side frames (not shown) are provided below both side edges of the opening portion 3. The side frames guide the roof panel 4, support the deflector arm 8B, and support the urging member 12. The front frame 11 is formed as a long member in the vehicle width direction so as to connect front ends of the side frames respectively, and is provided below the leading edge of the opening portion 3. When the roof panel 4 is opened, the upper holder 8 is urged upward by the urging member 12 and the deflector net 6 is extended as shown with a virtual line (so that loosing C occurs as described below). When the roof panel 4 is closed, the upper holder 8 is placed in the front frame 11, and the deflector net 6 is folded to be housed in the front frame 11 as shown with a solid line.

Defining Portion 21

In a prior art deflector device, an upper holder which is urged upward by an urging member is drawn by a fully extend deflector net, is prevented from moving upward, and is held at an upper limit position. In contrast, the deflector device 5 of the present invention is provided with the defining portion 21 which defines an upper limit position of the upper holder 8 against an urging force caused by the urging member 12 so that loosing C occurs on at least a part of the deflector net 6 in the vertical direction. The loosing C occurs in a range of at least an area which is connected to the center holder portion 8A blown by drive airflow. The defining portion 21 includes, for example, a stretching portion 22 stretched by an urging force caused by the urging member 12 between the lower holder 7 and the upper holder 8.

First Embodiment

Figure 4:
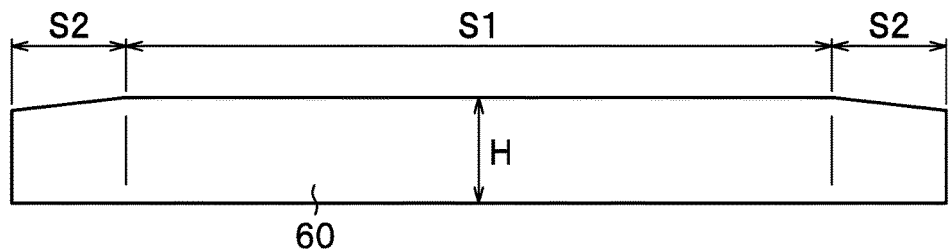
FIG. 4 is a development view of a deflector net of a prior art.

FIG. 4 shows a development view of a deflector net 60 of the prior art as a comparative example. A range S1 shows a portion attached to the center holder portion 8A (see FIG. 1), a range S2 shows a portion attached to the deflector arm 8B. The deflector net 60 of the prior art has a constant vertical length H along the range S1, and the deflector net 60 is evenly extended all along the range S1. The upper line is formed to be inclined along the deflector arm 8B so that the deflector net 60 is evenly extended along the range S2.

Figure 3:
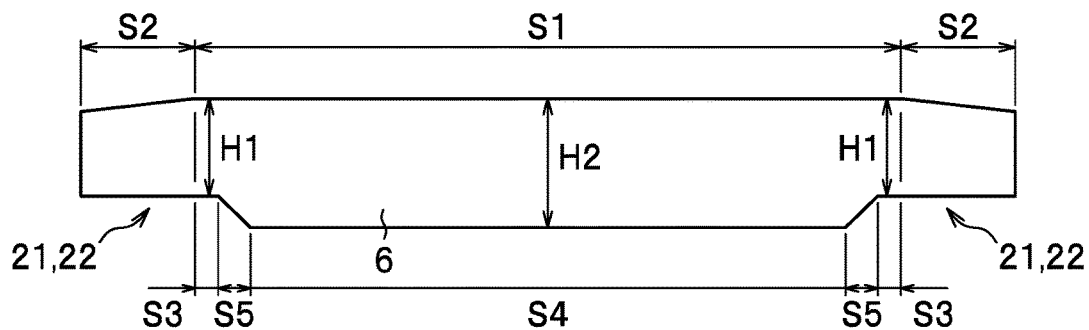
FIG. 3 is a development view of a deflector net of a first embodiment.

In contrast, the deflector net 6 according to a first embodiment is formed so that a vertical length of the deflector net 6 is made to be partially short along a vehicle width direction (see the stretching portion 22). FIG. 3 shows one example. The range S1 is provided with a range S4 having a length H2 at center, and ranges S3, S3 having a length H1 which is shorter than the length H2 at both ends of the range S4. An intermediate ranges S5, S5 whose vertical length is gradually varied is provided between the range S3 and the range S4. In this example, the stretching portions 22, 22 are formed of the ranges S2, S2 and the ranges S3, S3. This configuration can be achieved easily by cutting and sewing a fabric material, and can be attached to the lower holder 7 like the prior art. When the deflector net 6 is extended, the upper limit position of the upper holder 8 is defined by stretching the ranges S2, S2 and the ranges S3, S3. At that time, the loosing C occurs in the range S4 and the intermediate range S5 in the vertical direction by the length longer than the length H1.

Action

First, referring to FIGS. 7A-7D, action of the deflector net 60 of prior art will be explained. As shown in FIG. 7A, the upper holder 8 is prevented from moving upward by the extended deflector net 60 during vehicle stop. At that time, a reaction force P1 caused by the urging member 12 acts on the upper holder 8 upward. When the deflector net 60 is blown by the drive airflow at vehicle traveling time, the deflector net 60 is bent backward, and a wind force P2 acts on the upper holder 8 along the deflector net 60. A wind force P4 is a backward component force of the wind force P2, and a wind force P3 is a downward component force of the wind force P2. The wind force P3 is opposite to the reaction force P1. As shown in FIG. 7B, for example, the reaction force P1 is equal to the wind force P3 when the vehicle travels at 50 km/h. Before the vehicle arrives at 50 km/h, the upper holder 8 is positioned at the upper limit position. When the vehicle travels at 50 km/h or more, the wind force P3 becomes greater than the reaction force P1. As shown in FIGS. 7C and 7D, the higher the vehicle traveling speed (e.g., 100 km/h, 120 km/h), the lower the upper holder 8 is moved.

Next, referring to FIGS. 6A-6D, action of the deflector net 6 of this embodiment will be explained. The upper holder 8 is prevented from moving upward by the stretching portion 22 which includes the ranges S3, S2 (see FIG. 3) during vehicle stop. As shown in FIG. 6A, a loosing C occurs in the range S4. A reaction force P1 caused by the urging member 12 acts on the upper holder 8 upward. When the deflector net 6 is blown by the drive airflow at vehicle traveling time, a downward wind force P3 does not act on the upper holder 8 till the loosing C disappears and the deflector net 6 is extended. That is, when the wind force P3 begins to act on upper holder 8, the vehicle traveling speed is higher than that of the prior art. In this way, as shown in FIG. 6B, a reaction force P1 is greater than a wind force P3 at 50 km/h, and the upper holder 8 is held at the upper limit position. As shown in FIG. 6C, for example, the reaction force P1 is equal to the wind force P3 at 100 km/h. As shown in FIG. 6D, the wind force P3 is greater than the reaction force P1 at 120 km/h, and the upper holder 8 is moved downward.

Figure 8A:
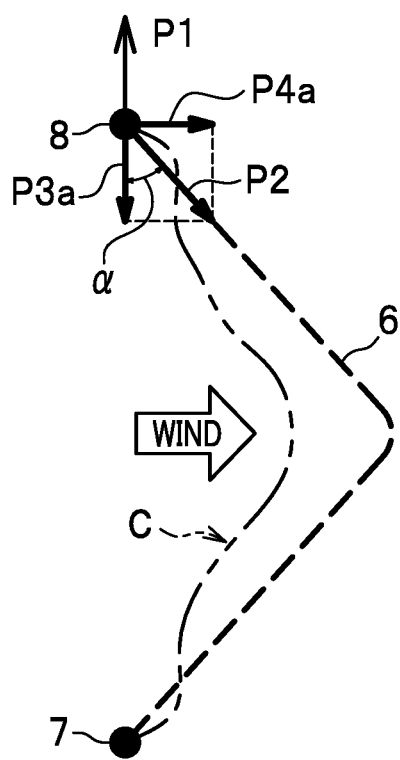
FIG. 8A is a sectional view showing action of the deflector net of the present invention.
Figure 8B:
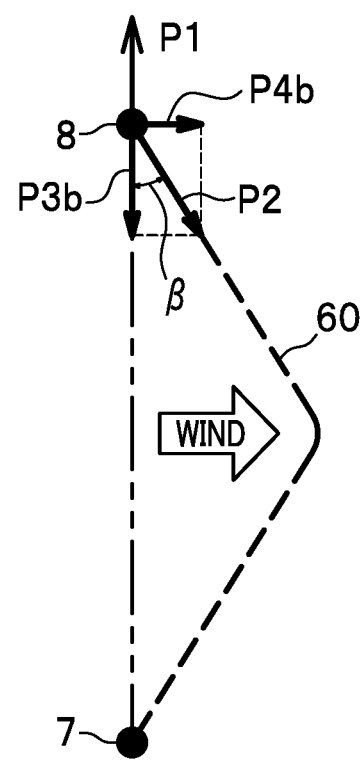
FIG. 8B is a sectional view showing action of the deflector net of the prior art.

In addition, since the loosing C exists at the beginning, a vertical center portion of the extended deflector net 6 is pushed backward largely and more inclined than the prior art. FIG. 8A shows that situation. FIG. 8A shows a deflector net 6 of the present invention, and FIG. 8B shows a deflector net 60 of the prior art. When both upper holders 8 are at the same height, both deflector nets 6, 60 are stretched and extended backward by wind pressure. Since the loosing C exists on the deflector net 6 of the present invention at the beginning, an inclination angle α (an angle between a vertical direction and an extended direction of the deflector net) of the deflector net 6 is greater that an inclination angle β of the deflector net 60 of prior art. Therefore, with respect to a wind force P4 as a backward component force, when the same wind forces P2 are applied on the deflector nets 6, 60 respectively, a wind force P4a which acts on the deflector net 6 is greater than a wind force P4b which acts on the deflector net 60. On the other hand, with respect to a wind force P3 as a downward component force, a wind force P3a which acts on the deflector net 6 is smaller than a wind force P3b which acts on the deflector net 60. In this way, the deflector net 6 of the present invention less tends to be moved downward than the deflector net 60 of prior art does.

As described the above, the deflector device 5 of the present invention is provided with the defining portion 21 which defines an upper limit position of the upper holder 8 against the urging force caused by the urging member 12 so that the loosing C occurs on at least a part of the deflector net 6 in the vertical direction. Since the loosing C exists, the vehicle traveling speed at the time when the upper holder 8 begins to be moved downward by the drive airflow can be increased. In this way, the displacement of the upper holder 8 at high speed traveling can be suppressed. When a vehicle follows a preceding vehicle at high speed traveling, a flapping of the upper holder 8 caused by the turbulence can be suppressed, and generation of a flapping sound can be suppressed.

When the defining portion 21 includes the stretching portion 22 stretched by an urging force caused by the urging member 12 between the lower holder 7 and the upper holder 8, there is no need to provide an installation space for the stretching portion 22 separately, and the stretching portion 22 can be stored in a storage space of the deflector net 6.

When a vertical length of the deflector net 6 of the stretching portion 22 is made to be partially short along the vehicle width direction, there is no need to provide a member dedicated for the stretching portion 22 separately, and an economical deflector device can be achieved.

When the stretching portions 22 are provided at both sides of the deflector net 6 in the vehicle width direction, the deflector net 6 is largely affected by the drive airflow, the loosing C can occur at a center portion of the deflector net, and the displacement of the upper holder 8 can be effectively suppressed.

Second Embodiment

Figure 5A:
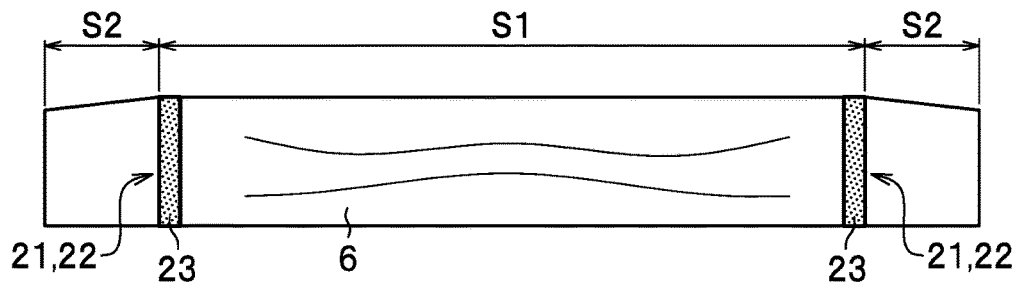
FIG. 5A is a development view of a deflector net of a second embodiment.
Figure 5B:
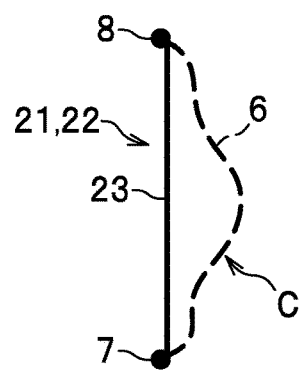
FIG. 5B is a cross-sectional view of the deflector net of the second embodiment.

As shown in FIG. 5A, according to a second embodiment, the stretching portion 22 is separated from the deflector net 6 and made of a flexible stretching member 23. As shown in FIG. 5B, when the stretching member 23 is stretched, the loosing C occurs on the deflector net 6 in the vertical direction. For example, the stretching member 23 is a vertically oriented strip member, and a material thereof is not limited unless the material is flexible. For example, the material may be the same as that of the deflector net 6. Since the stretching member 23 is flexible, it can be easily folded to be housed in the front frame 11. For example, the stretching members 23 are provided at both sides of the deflector net 6 in the vehicle width direction so that the loosing C occurs on all over the range S1 of the deflector net 6.

The deflector net 6 of the second embodiment can achieve the same effect as that of the first embodiment due to the loosing C. In addition, although the stretching member 23 has been described as a strip, the stretching member 23 may be formed to be wide in the view of tension.

As described above, preferred embodiments of the present invention have been explained. In the two embodiments, the defining portion 21 includes the stretching portion 22 stretched by the urging force caused by the urging member 12 between the lower holder 7 and the upper holder 8. However, the defining portion 21 is not limited to the above. For example, the defining portion 21 may be a stopper which prevents the upper holder 8 from moving upward while the deflector net 6 is still loosen. For example, it is possible to prevent the upper holder 8 from moving upward at a predetermined position by providing the stopper in the vicinity of the upper holder 8. Also, the loosing C may occur on all over the deflector net 6.

REFERENCE NUMERALS

1: sunroof
2: fixed roof
3: opening portion
4: roof panel
5: deflector device
6: deflector net
7: lower holder (lower end holding portion)
8: upper holder (upper end holding portion)
11: front frame
12: urging member
21: defining portion
22: stretching portion
23: stretching member

The invention claimed is:

1. A deflector device for a vehicle sunroof, the deflector device comprises:
   a cloth deflector net which is extended to be blown by drive airflow during operation period and folded to be housed during non-operation period;
   a lower end holding portion which holds a lower end side of the deflector net;
   an upper end holding portion which holds an upper end side of the deflector net and is movable in a vertical direction;
   an urging member which urges the upper end holding portion upward; and
   a defining portion which defines an upper limit position of the upper end holding portion against an urging force caused by the urging member so as to loosen at least a part of the deflector net wherein,
   the defining portion includes a stretching portion stretched by an urging force caused by the urging member between the lower end holding portion and the upper end holding portion, and a vertical length of the deflector net of the stretching portion is made to be partially short along the vehicle width direction.

2. The deflector device according to claim 1, wherein the deflector net is made of a flexible stretching member separated from the stretching portion.

3. The deflector device according to claim 1, wherein the stretching portions are provided at both sides of the deflector net in the vehicle width direction.

* * * * *